United States Patent [19]

Stafford

[11] 4,328,440

[45] * May 4, 1982

[54] COMMUTATOR

[75] Inventor: Michael J. Stafford, Lichfield, England

[73] Assignee: Lucas Industries Limited, Birmingham, England

[ * ] Notice: The portion of the term of this patent subsequent to Jan. 27, 1998, has been disclaimed.

[21] Appl. No.: 143,550

[22] Filed: Apr. 25, 1980

Related U.S. Application Data

[63] Continuation of Ser. No. 767,034, Feb. 9, 1977, Pat. No. 4,247,795.

[30] Foreign Application Priority Data

Feb. 20, 1976 [GB] United Kingdom ................. 6721/76

[51] Int. Cl.[3] ............................................. H02K 13/00

[52] U.S. Cl. ..................................................... 310/233

[58] Field of Search ................................ 310/233-237, 310/219, 231, 232

[56] References Cited

U.S. PATENT DOCUMENTS

| | | | |
|---|---|---|---|
| 1,354,005 | 9/1920 | Sloan | 310/236 |
| 2,492,657 | 12/1949 | Sauer | 310/236 |
| 2,501,502 | 3/1950 | Fletcher | 310/236 |
| 3,036,023 | 5/1962 | Rogers, Jr. et al. | 310/236 |
| 3,141,984 | 7/1964 | Rubio-Medina | 310/236 |
| 3,459,983 | 8/1969 | Bowcott | 310/236 |
| 3,564,316 | 2/1971 | Witzenburg | 310/236 |
| 3,708,872 | 1/1973 | Ohuchi | 310/236 |
| 4,247,795 | 1/1981 | Stafford | 310/233 |

FOREIGN PATENT DOCUMENTS

| | | | |
|---|---|---|---|
| 736623 | 11/1932 | France | 310/236 |
| 1204199 | 1/1960 | France | 310/237 |

*Primary Examiner*—R. Skudy

*Attorney, Agent, or Firm*—Schwartz, Jeffery, Schwaab, Mack, Blumenthal & Koch

[57] ABSTRACT

A commutator including a support sleeve, a plurality of commutator segments equiangularly spaced around the support sleeve, said segments being electrically insulating from one another and each having a base region of dovetail form having its widest end presented to the sleeve. Integral with the sleeve adjacent one axial end thereof is a first retaining flange which defines a first internal frusto-conical surface coacting with one inclined face of the base region of each of said segments to locate the segments axially and raidally relative to the sleeve. The sleeve is deformed outwardly adjacent its axial end remote from said flange to resist movement of the segments axially of the sleeve away from said flange.

4 Claims, 4 Drawing Figures

COMMUTATOR

This is a continuation, of application Ser. No. 767,034, filed Feb. 9, 1977 now U.S. Pat. No. 4,247,795.

BACKGROUND OF THE INVENTION

This invention relates to a commutator for a dynamo electric machine.

SUMMARY OF THE INVENTION

A commutator according to the invention includes a support sleeve, a plurality of commutator segments equiangularly spaced around the support sleeve, said segments being electrically insulated from one another and each having a base region of dovetail form having its widest end presented to the sleeve, a first retaining flange integral with the sleeve adjacent one axial end thereof said flange defining a first internal frustoconical surface coating with one inclined face of the base region of each of said segments to locate the segments aixally and radially relative to the sleeve, and, the sleeve being deformed outwardly adjacent its axial end remote from said flange to resist movement of the segments axially of the sleeve away from said flange.

Preferably, the opposite inclined face of each segment base region coacts with a second internal frusto-conical surface.

Conveniently, said second internal frusto-conical surface is defined on a locking ring encircling the sleeve and held against axial movement relative thereto in a direction away from said flange by said outward deformation of said sleeve.

Desirably, said ring is resilient in an axial direction and is loaded axially during deformation of the sleeve so as to bias said segments towards said first flange.

Alternatively said outward deformation of the sleeve defines a second retaining flange in turn defining the second internal frusto-conical surface.

Desirably, the sleeve is metallic and a frusto-conical insulating member isolates the or each retaining flange from said segment base regions.

Preferably, where the sleeve includes both said first and second retaining flanges a frusto-conical washer is interposed between the insulating member and the second flange the washer serving to protect the insulating member during deformation of the sleeve to form the second flange.

Preferably said first flange is formed, before assembly of the commutator, by outward deformation of the sleeve.

BRIEF DESCRIPTION OF THE DRAWINGS

One example of the invention is illustrated in the accompanying drawings wherein.

DETAILED DESCRIPTION OF A PREFERRED EMBODIMENT

Figure 1:
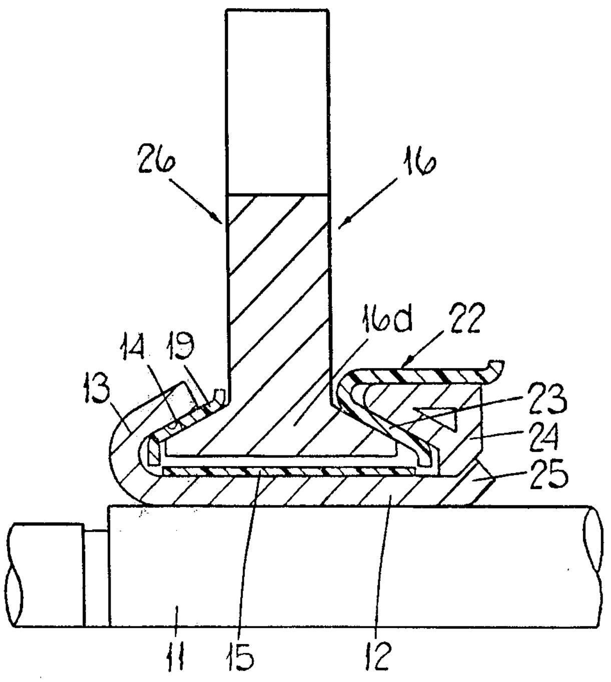
FIG. 1 is a fragmentary sectional view of a face commutator shortly before completion of its construction.
Figure 2:
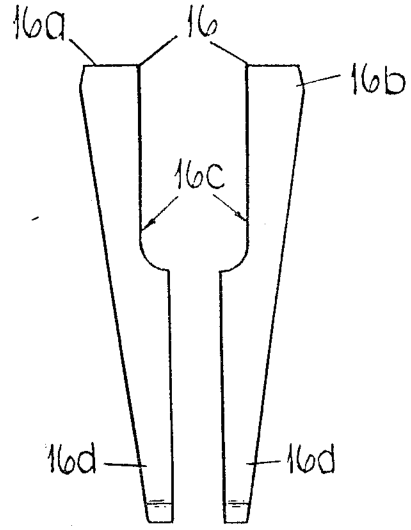
FIG. 2 is an end view of a pair of parts of a segment of the commutator shown in FIG. 1.
Figure 3:
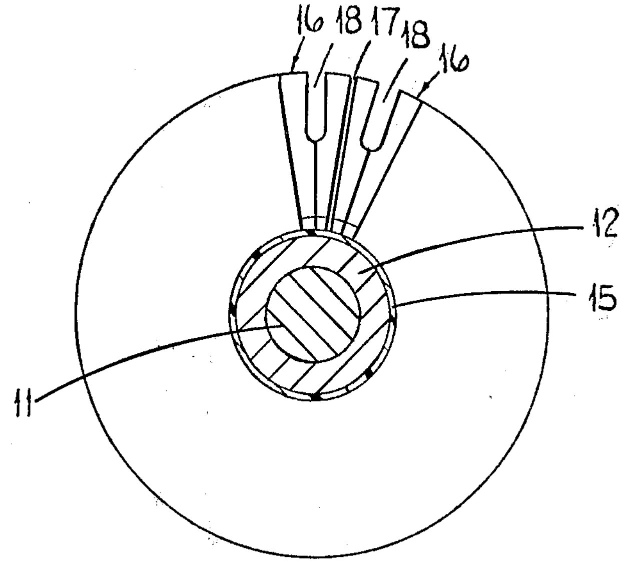
FIG. 3 is a diagrammatic, front elevational view to a reduced scale of the commutator shown in FIG. 1.

Referring first to FIGS. 1 to 3 of the drawings, the commutator shown is a face commutator but it is to be understood that the technique of assembly can if desired be applied to a barrel commutator. The commutator is intended to be mounted on a cylindrical shaft 11 for rotation therewith, and comprises a steel support sleeve 12 of circular cross-section within which in use the shaft 11 is received. Adjacent one axial end the sleeve 12 is formed with an outwardly extending flange 13 the flange 13 extending at an angle to the axis of the sleeve 12 such that the inner face 14 thereof presents a frusto-conical surface to the outer surface of the sleeve 12, the narrowest diameter of the frusto-conical surface being adjacent the point at which the flange 13 merges with the remainder of the sleeve 12.

Encircling the sleeve 12 and a close fit thereon is a sleeve 15 of electrically insulating material. Equiangularly disposed around the sleeve 12 and extending radially outwardly therefrom is a plurality of copper commutator segments 16 each of which is spaced circumferentially of the sleeve 12 from its neighbour by an electrically insulating spacer 17. Each segment 16 is formed in two parts (FIG. 2) 16*a*, 16*b* which are identical with one another. Each part of the commutator segment is stamped from a copper strip of wedgeshaped transverse cross-section so that each segment part tapers, increasing in thickness from a minimum adjacent one end, the radially innermost end in use, to a maximum adjacent its other end. The thicker, outer ends of the segment parts 16*a*, 16*b* are releaved at 16*c* so that when the two parts 16*a*, 16*b* of each segment are placed in contact with their relieved regions 16*c* adjacent one another then the relieved region 16*c* defines in the segment a slot 18 which, in use, extends radially inwardly of the segment from the outer periphery thereof. It will be understood that the dimension referred to as the thickness of the segment, or of the segment part, is that dimension which extends generally circumferentially in the completed commutator.

Each commutator segment is produced in two parts for convenience. Of course each segment could be of unitary construction if desired. In use of the commutator the segments are in effect unitary, and so hereinafter the segments will be referred to as if they were of unitary construction.

The depth of each segment, that is to say the dimension measured parallel to the axis of the sleeve 12 in the finished commutator, is substantially constant except in the thinnest, radially innermost region 16*d* thereof. In the region 16*d* of each segment the depth of the segment increases from a minimum to a maximum at the free end of the region 16*d*. Both the front and rear faces of the region 16*d* of each segment are inclined outwardly with respect to the remainder of the segment and so each segment can be considered to be of generally dovetail form adjacent its radially innermost end. The electrically insulating spacers separating each segment from its neighbour are similarly shaped.

The commutator is assembled in the following manner. The sleeve 15 is positioned on the sleeve 12, and an electrically insulating ring 19 is engaged with the sleeve 12, the ring 19 being generally of frusto conical form and having a cone angle similar to the cone angle of the surface 14 of the flange 13. At its apical end the ring 19 includes an inturned region and at its opposite end the ring 19 includes an outwardly turned region. The angle defined between the inner surface of the ring 19 and the outersurface of the sleeve 15 is equal to the angle defined between the inclined region of the front face of each segment 16 and the free, innermost edge of each segment. The segments together with the intervening spacers are arranged around the sleeve 15 with their radially innermost edges presented to the sleeve 15 and their front faces abutting the inner surface of the ring 19. A second electrically insulating ring 22 is then threaded onto the sleeve 12, the ring 22 including a cylindrical part having an inwardly directed frusto conical flange 23 integral therewith. The angle subtended between the inner surface of the flange 23 and the cuter surface of the sleeve 15 is equal to the angle subtended between the inclined region of the rear face of each segment and the free, radially innermost edge of each segment. The ring 22 is moved axially towards the ring 19 to engage the inclined region of the rear face of each segment with the flange 23.

A resiliently compressible metal annulus 24 having a frusto-conical inner surface is engaged within the ring 22 between the generally cylindrical part of the ring 22 and the inwardly directed flange 23. The annulus 24 and the ring 22 are pressed axially of the sleeve 12 towards the flange 13 so that the flange 13 and the ring 19 and the flange 23 and the annulus 26 coacting with the dove-tail form of the region **16*d* of each segment serve to clamp each segment both radially inwardly onto the sleeve 15, and axially relative to the sleeve 12, the electrically insulating segment spacers 17 being similarly clamped. When the ring 22 and annulus 24 have been sufficiently far to clamp the segments firmly in the desired orientation relative to one another and to the sleeve 12 the axial end of the sleeve 12 remote from the flange 13 is deformed outwardly to define a second flange 25 abutting the annulus 24 and preventing axial movement of the annulus 24 in a direction away from the flange 13. The resiliently compressible annulus 24 is stressed during the formation of the flange 25 so that a resilient clamping action on the segments 16 and spacers 17** is achieved.

Thereafter, the sleeve 12 is mounted on a machine spindle equivalent to the shaft 11 and the commutator is rotated so that the front face 26 thereof can be machined to render it planar and accurately at right angles to the axis of the sleeve 12.

The annulus 24 can of course take a number of forms, the annulus shown in the drawings being a hollow metal construction. It is to be understood however that a relatively hard synthetic resin material could be used either in a solid form, or in a hollow form similar to that shown in FIG. 1.

In a barrel version of the above commutator the only significant difference is in the shape of the segments 16 other than in their region **16*d*** which remains unchanged.

Figure 4:
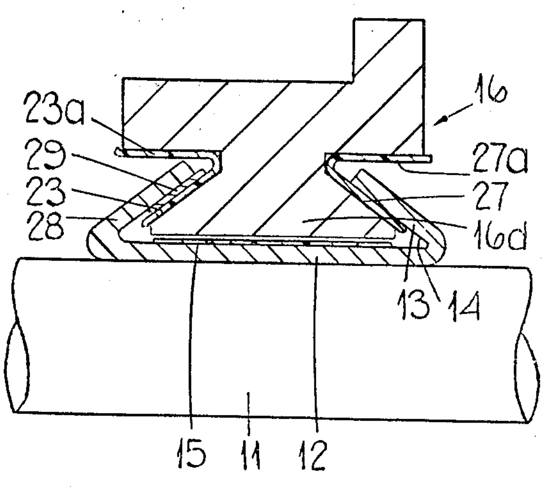
FIG. 4 is a view similar to FIG. 1 but of a modification applied to a barrel type commutator.

In the modification shown in FIG. 4 the commutator is of the barrel type and the annulus 24 is dispensed with. The ring 19 is replaced by a ring 27 identical to the ring 23, the cylindrical extensions a of the rings being necessitated by the barrel shaping of the segments. The ring 27 engages the inclined region of the surface of each of the segments 16 presented to the preformed flange 13 and the ring 23 is engaged by a frusto-conical metal washer 29 which in turn is engaged by a flange 28 of the one-piece support sleeve 12 and similar to the flange 13. The assembly sequence in respect of the modification shown in FIG. 4 is similar to that described with reference to FIG. 1 with the exception that the ring 27 is engaged with the segments in place of the ring 19. The washer 29 is introduced, and finally the end of the one-piece support sleeve 12 remote from the flange 13 is deformed to define the flange 28 engaging the metal washer 29. In practice, the flange 13 on the sleeve 12 is preformed, and the flange 28 is formed by a rivetting type operation known as spin rivetting or "Taumel" rivetting after engagement of the ring 27 with the segments and their spacers and engagement of the washer 29 with the ring 23.

The washer 29 protects the ring 23 during the formation of the flange 28. The flange 13 is formed on the sleeve 12 prior to assembly of the commutator, by a similar spin rivetting operation.

It will be understood that both in FIG. 1 and FIG. 4 the commutator is shown shortly before completion. The flange 25 or 28 of the sleeve 12 has been formed and the segments 16 are in process of moving to their final position wherein their radially innermost ends abut the sleeve 15. However, as in shown in both drawings the segments 16 have not yet reached their final position since the radially innermost ends of the segments are still spaced from the sleeve 15.

I claim:

1. A commutator including a one-piece support sleeve having two axial ends, a plurality of commutator segments equiangularly spaced around the support sleeve, means for electrically insulating segments from one another, each of said segments having a base region of dove-tail form having its widest end presented to said sleeve, said one-piece support sleeve including a first retaining flange portion adjacent one of said axial ends thereof, said flange portion including means defining a first internal frusto-conical surface co-acting with a first inclined face of the base region of each of said segments for locating said segments axially and radially relative to said sleeve, and, said one piece support sleeve further including a second retaining flange portion adjacent the other axial end thereof, said second flange portion defining a second internal frusto-conical surface co-acting with a second inclined face of the base region of each of said segments whereby both the first retaining flange portion and the second retaining flange portion comprise means for locating said segments axially and radially relative to said support sleeve.

2. A commutator according to claim 1, wherein said one-piece sleeve is comprised of a metallic material and said commutator includes a frusto-conical insulating means for insulating each of said first and second retaining flange portions of said sleeve from said segment base regions.

3. A commutator according to claim 2, wherein a frusto-conical washer is interposed between said insulating means and said second retaining flange portion, said frusto-conical washer comprising means for protecting said insulating means during deformation of the one-piece sleeve to form the second flange portion.

4. A commutator according to claim 1, wherein said first flange portion comprises an outward deformation of a portion of said one-piece sleeve.

* * * * *